Patented Sept. 7, 1937

2,092,601

UNITED STATES PATENT OFFICE 2,092,601

COMPOSITION OF MATTER FOR SEALING AND IMPREGNATING

Wilbur O. Dayton, Chicago, Ill., assignor to Whitday Company, Chicago, Ill., a corporation of Illinois No Drawing. Application December 21, 1936, Serial No. 116,998

4 Claims. (Cl. 106—23)

My present invention relates to the provision of a composition of matter suitable for the filling, sealing and calking of joints and the impregnation of fibrous material.

My primary object was the provision of a composition of matter suitable as a road joint filler which would attain and retain a sufficient solidity in hot weather and elasticity and flexibility in cold weather so as to constitute a dependable filler and seal for road joints during both hot and cold weather.

In calking joints, in order to seal the joints against the admission of water or moisture it has long been the practice to first drive into the joint oakum, or other like fibrous material, which, in its compacted form constituted a stopper for the joint, and then to pour over the compacted oakum hot marine pitch, or other suitable composition. This procedure resulted in but little, if any, impregnation of the fibrous material by the pitch, and each of these elements performed its function independently. I have discovered that if oakum or other fibrous material is impregnated with a suitable sealing composition before compacting it, these elements may be brought into conjoint operation which will require less compacting and result in a more dependable joint of considerably longer life.

I have had in mind the provision of a filling and sealing composition which could be simply poured into the joint without heating and which would secure the necessary high degree of contact with the surfaces of the joint requisite for dependable sealing and upon solidification would have requisite mechanical strength with resiliency and flexibility throughout a requisite range of temperatures to constitute a dependable filler and seal.

Water and aqueous solutions in general are capable of making intimate contact with and permeating a larger number of substances than any other permeating material, although there are certain oils and greases which appear to be repellent to water. The number of such water repelling substances are relatively small with respect to the substances with which water is capable of making intimate contact and impregnation. I have, therefore, sought to provide a composition, the fluidity of which was of an aqueous rather than of an oily nature.

As will hereafter be seen my invention relates to both the process, or procedure, employed and the resultant product or sealing and impregnating composition.

The principal ingredient of my composition is asphaltum, which in itself, constitutes an excellent excluder of water but which I reduce to any desired degree of fluidity by the addition of caustic soda, rosin and water with grinding and mechanical mixing.

Another element of my invention is a fluid rubber, generally known to the trade as latex, although the dictionary definition of latex would confine the meaning thereof to the sap of the rubber bearing trees. The rubber which I employ is in ammoniacal aqueous solution.

The amount of water employed in liquefying the asphalt and rubber is not important chemically or on the resultant final product, but it is important in producing a composition which will pour with facility and make suitable contact and secure suitable impregnation, and the amount of water and the fluidity should be regulated by the conditions to be met. For instance, thorough impregnation of fibrous materials, such as oakum or jute, requires greater fluidity than when it is desired merely to pour the composition into a joint for the filling of the joint.

To the aqueous rubber solution I add wood flour, preferably pine wood flour, and also dehydrated lime. The addition of the wood flour should be extremely thorough. After the original addition of the wood flour to the rubber solution and the thorough mixing thereof, the mass should be left at least over night and then thoroughly mixed again. The dehydrated lime may be added either to the rubber solution or to the fluid asphaltum. When the fluid asphaltum and the rubber solution are mixed together the mass may be maintained in a state of desired fluidity if placed in containers which can be closed so as to prevent evaporation. Within twelve hours or less after such fluid mass has been poured sufficient evaporation will have resulted as to cure the mass so that thereafter it will remain sufficiently solid for mechanical purposes with a requisite amount of flexibility and elasticity throughout a normal range of temperature and after the curing of the product, as above described, it is not again possible to either dissolve it or reduce it to fluidity with water or such solvents as may reach it through the inclemency of the weather.

For securing a product suitable for filling road joints in this latitude or for impregnating oakum, or other fibrous material, I take 100 pounds asphaltum, 5 pounds caustic soda, 5 pounds rosin. These materials are ground and mixed with sufficient water to produce a mixture of desired fluidity.

Latex is purchased or crude rubber is ground in the presence of a solution of ammonia in water until a mixture of desired fluidity is secured. To 20 pounds of the fluid rubber is added 10 pounds of wood flour (preferably pine wood flour). These substances are mixed and permitted to stand for twelve or more hours and remixed. 10 pounds of dehydrated lime is then added and thoroughly mixed. After the substances have been prepared, as above described, 100 parts of the asphaltum composition is mixed with 40 pounds of the rubber composition and the product is packaged and protected against evaporation until the same is used.

It will be found upon curing that the resultant product will be of a character somewhat denser than cork, which is impervious to water, and which will have no tendency to soften at high temperatures or to shatter or crumble at low temperatures.

Having described my invention what I claim is new and desire to secure by Letters Patent is:

1. The process of forming a composition of matter comprising the grinding together of asphaltum, caustic soda and rosin with sufficient water to secure a mixture of desired fluidity; second, the mixing together of rubber in a solution of ammonium and water and adding thereto wood flour and dehydrated lime; third, after the preparation of the above mixtures have been made the same are mixed together in the ratio of 100 parts of the mixture containing asphaltum and 40 parts of the mixture containing rubber.

2. The process of forming a composition of matter comprising the grinding together of asphaltum, 100 parts; caustic soda, 5 parts; rosin, 5 parts, with sufficient water to secure a mixture of desired fluidity; second, the mixing together of rubber, 20 parts, in a solution of ammonium and water and adding thereto 10 parts of wood flour and 10 parts of dehydrated lime.

3. A solidifiable plastic composition of matter comprising a fluid mixture of asphaltum, 100 parts; caustic soda, 5 parts; rosin, 5 parts, and water and a fluid mixture comprising rubber, 20 parts; ammonum, water, wood flour, 10 parts, and dehydrated lime, 10 parts, the said fluid mixtures being associated in the proportion of 100 parts of the mixture containing asphaltum and 40 parts of the mixture containing rubber.

4. A solidifiable plastic composition of matter comprising a mixture of asphaltum with a sufficient amount of caustic soda, rosin and water to secure a desired fluidity, rubber, ammonium, water, wood flour and dehydrated lime in proportions to secure a desired fluidity, the said fluids being combined in the proportion of 100 parts of the mixture containing asphaltum and 40 parts of the mixture containing rubber.

WILBUR O. DAYTON.